United States Patent [19]

Kay et al.

[11] Patent Number: 4,647,607
[45] Date of Patent: Mar. 3, 1987

[54] SYNTHETIC RUBBER WITH GUAYULE RESIN STABILIZATION

[75] Inventors: Edward L. Kay, Akron; Richard Gutierrez, Canal Fulton, both of Ohio

[73] Assignee: The Firestone Tire & Rubber Company, Akron, Ohio

[21] Appl. No.: 784,068

[22] Filed: Oct. 4, 1985

Related U.S. Application Data

[63] Continuation of Ser. No. 639,773, Aug. 13, 1984, abandoned.

[51] Int. Cl.$^4$ .......................... C08L 9/00; C08L 9/02; C08L 9/06; C08L 93/00
[52] U.S. Cl. ...................................... 524/77; 524/505; 524/518; 524/525; 524/571; 524/575
[58] Field of Search ............... 528/930; 525/88, 232, 525/233, 236; 524/77, 505, 518, 525

[56] References Cited

U.S. PATENT DOCUMENTS 4,435,337  3/1984  Kay et al. ......................... 528/930

FOREIGN PATENT DOCUMENTS 0039910  11/1981  European Pat. Off. ............ 528/930

OTHER PUBLICATIONS

"Plastification Effect of Guayule Resin on Raw Rubber", Winkler et al, Second International Conf., Saltillo, Mexico, 1977.
"Degradative Effects of Guayule Resin on Natural Rubber", Keller et al, paper No. 55,117 meeting of Rubber Div. Asc., May 1980.
"Guayule, an Alternative Source of Natural Rubber", National Academy of Sciences, Washington, D.C., 1977, p. 66.

Primary Examiner—Allan M. Lieberman
Attorney, Agent, or Firm—Daniel N. Hall

[57] ABSTRACT

Synthetic rubber is thermooxidatively stabilized with guayule resin. The guayule resin imparts favorable stabilization as evidenced by minimum bulk viscosity changes and minimum gel formation, especially with styrene-butadiene synthetic elastomers prepared by emulsion or hydrocarbon solvent techniques.

7 Claims, No Drawings

SYNTHETIC RUBBER WITH GUAYULE RESIN STABILIZATION

This is a continuation of application Ser. No. 639,773, filed Aug. 13, 1984, now abandoned.

TECHNICAL FIELD

The present invention relates to the use of guayule resin as a stabilizer for synthetic rubber. More specifically, the invention comprises the use of guayule resin as a thermooxidative stabilizer for styrene-butadiene synthetic elastomers prepared by emulsion or hydrocarbon solvent techniques.

BACKGROUND ART

The principal source of natural rubber is the rubber tree Hevea brasiliensis. Relatively recently, there has been renewed interest in the development of guayule rubber which can be recovered from the shrub Parthenium argentatum by several processes (Guayule, An Alternative Source of Natural Rubber; National Academy of Science; Washington, D.C.; 1977). The guayule shrub grows in semiarid regions not really suitable for food crops; therefore, the guayule shrub could utilize marginal land to produce a natural rubber very similar to tree rubber (Hevea rubber).

Unlike the Hevea tree which can produce rubber latex for many years, the guayule shrub must be harvested and processed to recover rubber. The basic reason for this requirement is that rubber latex forms in ducts in the Hevea tree, whereas rubber latex in the guayule shrub is contained in individual cells (ibid, page 24) which must be ruptured to release the rubber. Generally, the whole guayule shrub is harvested and processed to recover the rubber. An alternative procedure is to cut the portion of the shrub above ground and process the top portion of the shrub allowing the root system to generate a new plant. This procedure is referred to as "pollarding".

Regardless as to whether whole or pollarded shrub is processed, economics dictate that preferably the contained rubber as well as non-rubber constituents of the guayule shrub be utilized to improve the commercial feasibility of a guayule rubber industry. A major component of the guayule shrub is resin. The resin content of a typical shrub will range from 5 to 15 percent (ibid, page 35).

Guayule resin can be extracted from resinous guayule rubber (ibid, page 39) or can be extracted directly from the shrub prior to recovering rubber (Paper No. 54, "Guayule Shrub Deresination", presented at the 117th Meeting of the Rubber Division, ACS, Las Vegas, Nev.; May 20-23, 1980).

Unlike Hevea rubber, guayule rubber does not contain natural anti-oxidants and must be stabilized to prevent rapid degradation upon contact with air (ibid, page 25). Since guayule resin is very soluble in guayule rubber, it may be concluded that guayule resin does not or will not function as a stabilizer against the air oxidation of guayule rubber.

Winkler and Stephens have reported that guayule resin functioned as a peptizing agent for natural Hevea rubber and styrene-butadiene rubber (SBR). Specifically, the authors found that guayule resin promotes effective reduction in the gel content of Hevea and SBR (D. S. Winkler and H. L. Stephens, "Plastification Effect of Guayule Resin on Raw Rubber"; presented at the 2nd International Guayule Conference held in Saltillo, Mexico in 1977). The authors did not utilize guayule resin as a stabilizer as disclosed in this specification to prevent gel formation but rather to break down preformed gel.

Actually, Keller, Winkler and Stephens (Paper No. 55, "Degradative Effects of Guayule Resin on Natural Rubber", presented at the 117th Meeting of the Rubber Division, ACS; Las Vegas, Nev.; May 1980) reported the adverse effect of guayule resin on rubber. Specifically, these investigators reported that linoleic acid (which is a component of guayule resin) functioned as a prooxidant of guayule rubber. Further, the article entitled "Guayule, An Alternative Source of Natural Rubber" states on page 66 that during a milling operation some rubber may be degraded while it is in contact with guayule resin.

The preceding prior art citations would indicate that guayule resin would not have a stabilizing effect on rubber and possibly would be a relatively severe prooxidant. Unexpectedly, it has been discovered that guayule resin is an effective stabilizer for synthetic elastomers prepared in an emulsion or hydrocarbon system.

DISCLOSURE OF THE INVENTION

Therefore, it is an aspect of the present invention to provide guayule resin as a stabilizer for a synthetic elastomer.

It is yet another aspect of the present invention to provide a synthetic elastomer stabilized with guayule resin, as above, wherein the viscosity increase of said rubber upon aging is minimized.

It is a still further aspect of the present invention to provide a synthetic elastomer stabilized with guayule resin, as above, wherein said elastomer is styrene-butadiene rubber prepared by emulsion or hydrocarbon solvent techniques.

Generally, a stabilized synthetic elastomer, comprises: the synthetic elastomer; and from about 0.5 to about 20 parts by weight of guayule resin per 100 parts by weight of said synthetic elastomer.

BEST MODE FOR CARRYING OUT THE INVENTION

According to the present invention, various conventional synthetic rubbers are stabilized with guayule resin. Examples of specific synthetic rubbers which contain ethylenic unsaturation include styrene-butadiene rubber, a preferred elastomer; a random copolymer of ethylene-propylene, a block copolymer of ethylene-propylene, EPDM, that is a terpolymer of ethylene-propylene and a diene, e.g., norbornene, butyl rubber, neoprene, polybutadiene rubber, nitrile rubber, and the like. Desirably, the elastomers are prepared either by emulsion polymerization or hydrocarbon solvent techniques. Such methods of preparation are well known to the art and accordingly any common or conventional emulsion polymerization or hydrocarbon solvent technique can be utilized in preparing the synthetic elastomers.

The synthetic elastomers can be stabilized through the utilization of conventional or common synthetic rubber stabilizing agents, to an extent sufficient to protect the rubber against degradation during storage. For example, from about 0.1 to about 5.0 parts by weight per 100 parts of rubber of a phenolic or amine type stabilizing agent can be utilized. Generally, such stabilization aspects does not form a part of the present invention.

The guayule resin utilized can be obtained in any conventional manner. For example, the guayule plant is initially crushed into small pieces utilizing standard or conventional apparatus such as a hammer mill or the like. Usually, the entire plant can be fed whole, that is with leaves thereon, to the crushing apparatus. Once the plant has been broken down into suitable particle size, the guayule resin is extracted therefrom. This extraction process can be in accordance with any conventional method. Typically, an organic polar solvent is utilized as the extracting solvent and includes solvents such as ketones having from 3 to 8 carbon atoms such as acetone, methyl ethyl ketone, and the like. Esters having from 3 to 8 carbon atoms can also be utilized as can alcohols having from 1 to 8 carbon atoms, or formates, acetates, propionates, etc., of such alcohols. Furthermore, ethers having from 2 to 8 carbon atoms can also be utilized such as dimethyl ether, and also cyclic ethers having from 4 to 8 carbon atoms such as tetrahydrofuran.

The extraction of guayule resin with a polar solvent can be effected by a semi-batch or continuous operation. The extract (guayule resin/solvent) can be filtered if desired and then solvent removed via distillation to recover the guayule resin. Acetone is the preferred solvent.

The extracted resin can be further separated into an insoluble as well as into a soluble fraction by the use of a hydrocarbon solvent such as hexane, a preferred solvent. Suitable hydrocarbon solvents include the various alkanes having from 4 to 9 carbon atoms, the cycloalkanes as well as the alkylcycloalkanes having from 5 to 10 carbon atoms such as cyclohexane, methyl ethyl cyclohexane, and the like. Moreover, the aromatics or alkyl substituted aromatics having from 6 to 12 carbon atoms such as benzene, toluene, xylene, and the like can also be utilized.

Regardless of whether the original resin is utilized or whether a fraction thereof, that is a hydrocarbon or non-polar soluble or insoluble fraction thereof is utilized, it has been unexpectedly found that such fractions stabilize the above noted synthetic elastomers. The amount of guayule resin utilized is from about 0.5 parts by weight to about 20 parts by weight per 100 parts by weight of said synthetic rubber and preferably from about 5.0 parts to about 10 parts by weight.

Measure of stabilization of the synthetic elastomer is that said synthetic elastomer has a gel content which is 90 percent or less than that of an unstabilized elastomer, and preferably a gel content of 70 percent or less when said elastomer is prepared by emulsion polymerization. When the synthetic elastomer or rubber is prepared via a solvent polymerization, the amount of gel in the stabilized synthetic rubber is generally 20 percent or less and preferably 10 percent or less as compared to an unstabilized synthetic elastomer.

Guayule resin is mixed with the particular synthetic rubber, or combinations of synthetic rubbers in any conventional manner. A common method includes utilizing a mill, at a temperature of from about 25° C. to about 75° C. and placing the synthetic rubber thereon. An appropriate amount of guayule resin is then added to said mill and thoroughly mixed. Upon completion, naturally the guayule resin-synthetic rubber mixture is removed and usually stored until specifically needed.

It is to be understood that the synthetic rubbers of the present invention can contain various conventional additives such as antioxidants, accelerators, fillers, extender oils, sulfur, and the like, in conventional amounts, as well known to the art and the literature.

Utility for the guayule resin-synthetic rubber mixture includes the general uses of the synthetic rubber, for example as in tires, conveyor belts, roofing membranes, shock absorbers, and various other rubber articles, generally referred to as "rubber mechanical goods."

The guayule resin-synthetic rubber mixture of the present invention was tested by placing a sample of the mixture in a forced-air oven held at a temperature of approximately 100° C. and removed after specific times. The aged samples were then analyzed for gel content and Mooney bulk viscosity determined so that these values could be compared with an unaged sample as well as with a control which did not contain guayule resin.

The gel content of the rubber samples was determined by heating the sample in toluene and determining the amount of insoluble material (ASTM D3616). The unaged synthetic elastomers are generally gel free or ungelled. Determination of Mooney viscosity is a procedure well known in the rubber industry (ASTM D1646).

Various types of prepared SBR, as well as various amounts of guayule resin, were utilized and tested for specific time periods set forth in Tables I and II. Accordingly, the invention will be better understood by reference to the following examples.

EXAMPLE 1

Table I

To determine the effectiveness of guayule resin relative to minimizing bulk viscosity changes and insoluble gel formation in SBR during prolonged forced-air oven aging, samples were prepared of an emulsion SBR as well as an SBR in a hydrocarbon solvent system containing 5 percent as well as 10 percent by weight guayule resin. The guayule resin was recovered via acetone extraction of guayule shrub prior to recovery of the guayule rubber.

Since guayule resin will vary in composition somewhat with age of shrub, season of harvest, time of storage of harvested shrub, etc., it was endeavored to obtain a sample of guayule resin that might represent resin obtained from large scale operation. Specifically guayule shrub was utilized which was growing wild in southwest Texas. Samples of shrub were harvested periodically over approximately a year. Each sample was deresinated with acetone in a semi-continuous extractor. Specifically, usually a five pound charge of hammermilled shrub (normally ⅛ inch in length) was charged to a glass column and acetone continuously circulated through the column until at least 85 percent and usually >90 percent of the resin was extracted. Acetone was removed by distillation to recover neat guayule resin. The bulk of the resin from each deresination was mixed together to form a composite that should approach the type of resin expected in large scale operations considering reasonable variations.

In Example 2, fractionated guayule resin was utilized. Specifically, the guayule resin obtained was diluted by extraction to the shrub (referred to as "shrub guayule resin") with an equal volume of commercial hexane, heated the mixture with stirring in an attempt to attain solubility equilibrium and then cooled the mixture to about 25° C. At about 25° C., solid resin separated (hexane insoluble resin fraction) and the hexane-soluble resin fraction was decanted from the solid. Both resin fractions were recovered by evaporating hexane from the samples on a steam plate. Generally, about 50 percent of the "shrub" resin was soluble in hexane; 50 percent insoluble.

The emulsion SBR did not contain processing oil; the solvent-prepared SBR contained 20 parts by weight of processing oil; therefore, it was able to determine the effects of guayule resin on SBR with and without oil. Both the emulsion and solvent prepared SBR base rubbers contained approximately 20 percent styrene and about 80 percent butadiene by weight. The emulsion SBR also contained soap residues from the soap used in the manufacture of the rubber.

Referring to the data in Table I, and specifically to the Mooney viscosity and "% gel" data on the original unaged samples, it will be noted that the viscosity of both SBR samples was lowered somewhat by the incorporation of guayule resin, but the "% gel" remained essentially zero. The "plasticizing" effect of guayule resin on the base rubbers was expected.

Referring to the test data on samples after one day oven aging, it will be noted that there was very little change in bulk viscosities as well as gel content. The results demonstrate that the base rubbers were relatively stable and that the guayule rubber had no apparent adverse effects on stability of the rubber. However, after aging six days, the gel content of the controls (no guayule resin added) significantly increased as compared to the samples containing guayule resin. These "% gel" data indicate that the guayule resin is an effective gel suppressant in the SBR samples after prolonged forced-air oven aging.

With respect to the Mooney viscosity results, it should be noted that the viscosity of the emulsion SBR rose to a high value of 101 units after aging 14 days. This high viscosity result represents a 206 percent increase relative to the original viscosity result. In contrast, the emulsion SBR sample containing 5.0 percent and 10 percent guayule resin had Mooney viscosity results of 79 and 65, respectively. The data indicate that the guayule resin minimized the increase in Mooney viscosity of the base rubber; and, in addition, the higher 10 percent resin level was the more effective. It should also be noted that the higher 10 percent resin level was also more effective in minimizing gel-formation.

Now, referring to the Mooney viscosity of the solvent-prepared SBR, it will be noted that the bulk viscosity showed a decrease after aging 6 and 8 days and an increase after a total of 14 day's aging. In contrast, the samples of solvent-prepared SBR containing guayule resin showed a relatively minor decrease after aging for 8 days (3 units for the 5 percent resin sample and 1 unit for the 10 percent resin sample). The 14 day bulk viscosity results showed a relative significant decrease for the 5 percent resin sample but only a 3 unit decrease for the sample containing 10 percent resin. These results again indicate the effectiveness of guayule resin relative to minimizing variation in bulk viscosity of SBR during prolonged forced-air oven aging. The higher resin concentration appears to be more effective.

TABLE I

Stabilization of Synthetic Rubber With Shrub Guayule Resin

| Forced-Air Oven Aging at 100° C., Days Aged: | Mooney 0 | Viscosity 1 | Results 6 | And 8 | (% Gel) 14 |
|---|---|---|---|---|---|
| Emulsion SBR | 49 (0.0) | 51 (0.0) | 88 (75) | 94 (72) | 101 (89) |
| Emulsion SBR Plus Shrub Guayule Resin | | | | | |
| 5.0% | 49 (0.0) | 49 (0.0) | 60 (7.0) | 70 (8.3) | 79 (60) |
| 10.0% | 44 (0.0) | 46 (0.0) | 56 (0.0) | 58 (0.0) | 65 (3.4) |
| Solvent-Prepared SBR | 79 (0.0) | 80 (0.9) | 67 (43) | 65 (59) | 82 (63) |
| Solvent-Prepared SBR Plus Shrub Guayule Resin | | | | | |
| 5.0% | 63 (0.0) | 65 (0.0) | 62 (0.0) | 60 (0.0) | 49 (0.0) |
| 10.0% | 55 (0.0) | 55 (0.0) | 54 (0.0) | 54 (0.0) | 52 (0.0) |

EXAMPLE 2

Table II

To further demonstrate the effectiveness of our invention, we extracted the guayule resin used in Example 1 with hexane to separate what we define as a relatively non-polar (hexane soluble) fraction and a relatively polar (hexane insoluble) fraction. These guayule resin fractions were mixed into the SBR samples used in Example 1 and aged in a forced-air oven at 100° C. using the same experimental procedure as was used in Example 1. Mooney bulk viscosities as well as gel content of the aged samples are summarized in Table II.

Referring to the original Mooney viscosities of the samples recorded in Table II, it will be noted that both of the resin fractions "plasticized" the SBR samples. The plastizing effect of the hexane soluble resin fraction is greater than that realized with the hexane insoluble resin fraction. It should be noted that all of the unaged samples did not contain gel.

With respect to the Mooney viscosities on the samples aged one day, there was relatively little change when compared to the original viscosities which indicates that the samples were relatively stable and that the guayule resin had no adverse effects on the stability. The gel content of 15.7 percent of the one-day aged emulsion SBR sample appears somewhat high as compared to the value reported in Table I and may be an erroneous result; however, the general trend of significantly increased bulk viscosity and gel content with increased aging time is noted on both emulsion SBR samples (controls in Tables I and II).

Comparing the Mooney viscosities on the emulsion SBR samples containing guayule resin, it should be noted that the viscosities are lower than the control values which would be expected since the original viscosities of the resin-containing samples were lower. However, when expressing the viscosities of the aged samples as a percentage of the original values, it will be noted that the samples containing hexane soluble and insoluble resin after aging for 16 days increased in bulk viscosity 183 percent and 180 percent, respectively, as compared to a 275 percent increase for the control. These results demonstrate the beneficial effect of guayule resin in emulsion SBR relative to minimizing bulk viscosity increase during aging. The beneficial effect of guayule resin is confirmed by the observed gel content of the aged samples. In all cases, the gel content of the experimental emulsion SBR/guayule resin samples was less than comparable values observed on the control. Generally, the hexane soluble and insoluble guayule resin fractions are equally effective in minimizing bulk viscosity and gel increase during aging of the emulsion SBR.

Interpretation of the Mooney viscosities of the solvent-prepared SBR samples, it will be noted that the viscosity of the control decreased and then increased to an 85 value after aging for 16 days (110 percent of the original value). In contrast, the sample containing the hexane soluble resin fraction showed a steady decrease, whereas the sample with hexane insoluble resin showed relatively little change in bulk viscosity during the complete aging period. Again, it can be noted that the gel content of the samples containing guayule resin fractions were significantly lower than the comparable values of the solvent-prepared SBR. These gel content data demonstrate the effectiveness of the guayule resin fractions with regard to supressing gel formation during accelerated aging of the base rubber.

TABLE II

Stabilization of Synthetic Rubber With Fractionated Shrub Guayule Resin

| Forced-Air Oven Aging at 100° C., Days Aged: | Mooney Viscosity Results And (% Gel) | | | | |
|---|---|---|---|---|---|
| | 0 | 1 | 6 | 9 | 16 |
| Emulsion SBR | 55 (0.0) | 56 (15.7) | 94 (59.3) | 127 (76.6) | 151 (87.7) |
| Emulsion SBR Plus Shrub Guayule Resin; 10.0% | | | | | |
| Hexane Soluble | 40 (0.0) | 41 (0.0) | 54 (1.8) | 62 (55.0) | 73 (57.1) |
| Hexane Insoluble | 45 (0.0) | 51 (0.0) | 69 (3.6) | 73 (3.6) | 81 (26.3) |
| Solvent-Prepared SBR | 77 (0.0) | 78 (0.9) | 60 (61.8) | 64 (64.3) | 85 (67.8) |
| Solvent-Prepared SBR Plus Shrub Guayule Resin; 10.0% | | | | | |
| Hexane Soluble | 54 (0.0) | 51 (0.0) | 40 (9.2) | 36 (0.0) | 28 (0.) |
| Hexane Insoluble | 58 (0.0) | 58 (0.0) | 57 (0.0) | 58 (0.0) | 55 (6.2) |

While in accordance with the patent statutes, a best mode and preferred embodiment has been set forth, the scope of the application is not limited thereto but rather by the scope of the attached claims.

What is claimed is:

1. A process for suppressing the aged gel content of a synthetic elastomer, comprising the steps of:
   adding from about 0.5 to about 20 parts by weight of a guayule resin to 100 parts by weight of an ungelled, unaged ethylenically unsaturated synthetic elastomer and forming a mixture thereof, and suppressing the aged gel content of said mixture.

2. A process according to claim 1, wherein said elastomer is selected from the group consisting of styrene-butadiene rubber, polybutadiene rubber, nitrile rubber, butyl rubber, neoprene, a random copolymer of ethylene-propylene, a block copolymer of ethylene-propylene, EPDM, and combinations thereof.

3. A process according to claim 2, wherein the amount of said guayule resin is from about 5 parts to about 10 parts by weight per 100 parts by weight of said synthetic rubber.

4. A process according to claim 3, wherein said synthetic elastomer is styrene-butadiene rubber.

5. A process according to claim 3, including preparing said synthetic elastomer by emulsion polymerization and wherein said guayule resin is a hydrocarbon-insoluble fraction of a polar extracted resin.

6. A process according to claim 3, including preparing said synthetic elastomer by solvent polymerization and wherein said guayule resin is a hydrocarbon-soluble fraction of a polar extracted resin.

7. A process according to claim 3, including mixing said guayule resin and said synthetic rubber at a temperature of from about 25° C. to about 75° C.

* * * * *